UNITED STATES PATENT OFFICE.

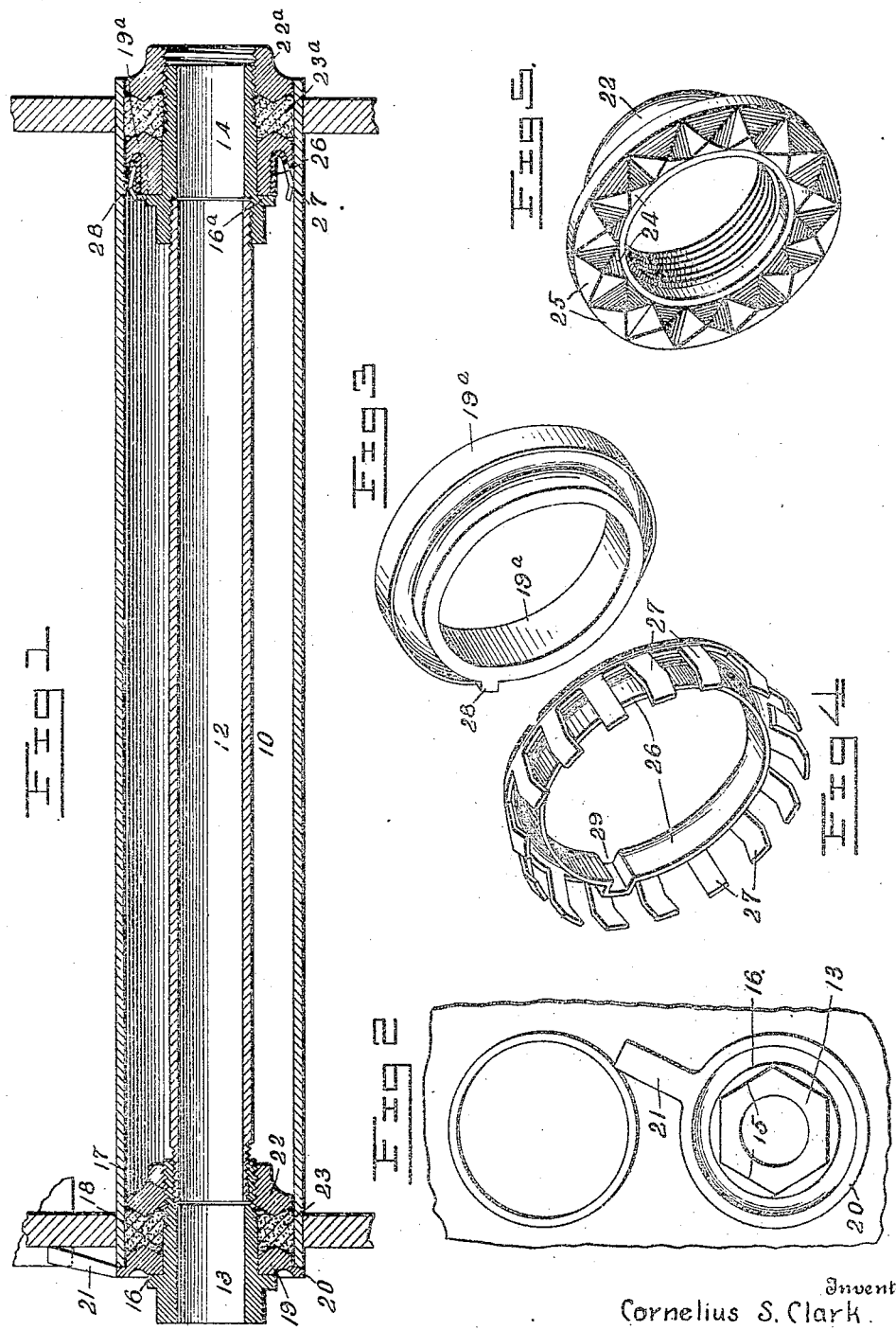

CORNELIUS S. CLARK, OF NORFOLK, VIRGINIA.

LEAK-STOPPER FOR BOILER-TUBES.

955,500. Specification of Letters Patent. Patented Apr. 19, 1910.

Application filed July 26, 1909. Serial No. 509,673.

*To all whom it may concern:*

Be it known that I, CORNELIUS S. CLARK, a citizen of the United States, residing at Norfolk, in the county of Norfolk and State of Virginia, have invented new and useful Improvements in Leak-Stoppers for Boiler-Tubes, of which the following is a specification.

My invention relates to leak-stoppers for boiler-tubes, and is an improvement in the leak-stopper forming the subject of my United States Letters Patent, No. 714,671, dated December 2, 1902. In that patent I described and claimed a leak-stopper comprising a tubular body portion adapted to extend within a defective boiler tube from end to end, and provided on each end with a head carrying a packing, which packing is forced into close engagement with the inner walls of the defective tube by the action of the packing head upon the manipulation of the body member. In said patent the body member is described as tubular. On each end of this tube and in engagement with shoulders and screw threads formed thereon are the female and male glands composing the packing heads. One of these glands is provided with means for engaging the boiler tube to prevent it from turning upon the turning of the tube in order to bring the glands together and spread the packing, while the other gland is also prevented from turning by a spline on the first gland which enters a groove or slot in its body.

It is the object of my present invention to improve the means for preventing these glands from turning, my efforts having been directed to the end of securing a more efficient, more durable and more cheaply constructed device. This improved means which I have designed and its connection with the leak-stopper forming the subject of my Patent, No. 714,671, above referred to, will be fully understood upon reference to the following description taken in connection with the accompanying drawings, in which—

Figure 1 is a sectional elevation of a boiler tube and the heads in which it is mounted showing the application of my device. Fig. 2 is an end view of the same. Fig. 3 is a perspective view of a gland. Fig. 4 is a perspective view of the friction ring used in connection therewith, and, Fig. 5 is a perspective view of the same gland showing the formation of its engaging surface or wall.

The body 10 of the leak-stopper is tubular in form and is preferably, though not necessarily, made in sections 12, 13 and 14, the sections 13 and 14 constituting what may be termed "outer" and "inner" heads respectively. The section 12 is made of suitable pipe of proper length to be inserted into the boiler tube to be repaired, so as to extend on opposite sides of the leak, crack or broken portion therein. The ends of the section 12 are provided with external screw threads which mesh with corresponding internal screw threads on the head-sections 13 and 14. The outer head section 13 is provided with polygonal faces 15 for the application of a wrench or other turning device, and has an inwardly facing shoulder 16 thereon. The inner end of said section 13 is also provided with external screw threads 17, but between the screw threads 17 and the shoulder 16 a smooth cylindrical portion 18 is left. Fitting loosely on this smooth portion 18 of the head section 13 is a gland or collar 19. This gland is provided with a flange 20 for engaging the end of the boiler tube, and projecting outwardly from this flange is a tang 21 for a purpose which will presently appear. Engaging the screw threaded portion of the head 13 is a second gland 22 which is without flange and tang. A packing 23 lies between the glands, and the walls of the glands next the packing are radially grooved, serrated or otherwise roughened. They are also beveled and preferably in two directions both inwardly and outwardly, as shown at 24 and 25.

On the head 14 I place two glands or collars 19ª and 22ª respectively. The gland 22ª is in all respects similar to the gland 22, but the gland 19ª is formed differently from the gland 19. It will be noted that it is not provided with a flange 20 or a tang 21. It is of the same diameter as the gland 22ª. On the side of the gland adjacent the shoulder 16ª it is hollowed out, and fitting within the hollow is a metal ring 26 provided with a plurality of spring projections or fingers 27. A boss or key 28 formed on the outer surface of the gland 19ª projects into the groove of an offset 29 in the ring 26, and prevents rotative movement of the same with respect to the gland 19ª. It will be noted that the spring fingers are bent over or curved at their ends. Like the glands 19 and 22, the glands 19ª and 22ª have their walls which engage the packing 23ª serrated or grooved and beveled, and they are mounted on the section 14 in the same manner as glands 19 and 22 are mounted on the section 13.

As thus constructed, the use of my device is as follows: The various members of the device are assembled as shown in Fig. 1 with the glands embracing the packings as tight as may be without expanding the packing so that it cannot be forced into the tube to be repaired. The device is next inserted in the tube with the section 14 foremost. The spring fingers 27 of the ring 26 then engage the inner walls of the inner end of the tube, while the flange 20 of the gland 19 engages the outer end of the tube as shown. With the device thus inserted in the defective tube, the gland 19 is rotated until the tang 21 engages the expanded or crimped end of a tube adjacent to the one being stopped. A wrench is then applied to the end 15 of the head 13 and the tube is turned to clamp the packing between the glands and expand it into steam tight engagement with the walls of the tube. During this turning of the tube the gland or collar 19 is prevented from turning not only by the frictional engagement of the flange 20 with the end of the tube as in my prior patent, but also by the positive engagement of the tang 21 with the end of the next adjacent tube. It will be noted that this tang is bent inwardly so that in its path of rotation it will firmly engage the end of the adjacent tube. The roughened, serrated or grooved walls of the glands engaging the packing prevent the inner gland 22 from rotating about the tube, and cause the packing to be forcibly expanded by the rotation of the tube within the glands, the screw threads of the tube section 13 co-acting with the screw threads of the gland 22 to draw it up and clamp the packing. Similarly at the opposite end of the device the glands 19 and 22 are drawn together. At this end, however, the gland 19ª is prevented from rotating by the engagement of the spring fingers 27 with the inner walls of the tube, while the gland 22ª is prevented from rotating by the conformation of the walls of the glands which engage the packing between them, as is the case with glands 19 and 22.

It will be observed that I have improved the means for preventing the turning of the glands at the front end of the tube by providing a positive means for engaging a fixed part of the boiler, and also that I have improved the means for preventing rotation of the glands at the inner end of the tube by providing a ring with a plurality of spring fingers which insure a much firmer frictional engagement with the walls than is the case when a plain split spring ring is used as in my patent referred to. I have also improved the device by omitting the dowels or splines between the packing members and providing instead the roughened, serrated or grooved expanding surfaces on the glands for engaging the packing. The bevel of the surfaces expands the packing while the roughened, serrated or grooved walls prevent the rotative movement of one gland with respect to the other. I find that a device provided with these improvements operates in an entirely satisfactory manner. While I have described these improvements in the best form in which they are now known to me, it is obvious that many changes might be made in their specific embodiment without departing from the generic spirit of my invention. It is also obvious that modifications may be made in the main body of the device to which they are applied without departing from the generic spirit of my invention. I desire to cover all such modifications in the annexed claims.

What I claim is:—

1. In a leak-stopper for boiler tubes, a pair of glands, packing therebetween, a means for clamping said glands together and upon the packing to expand it to stop the tube, and means comprising a projection in connection with one of said glands for preventing the turning of the glands during the clamping operation.

2. In a leak-stopper for boiler tubes, a pair of glands, packing therebetween, means for clamping said glands together and upon the packing for expanding the packing to stop the tube, and means comprising a tang in connection with one of said glands for preventing the turning of the glands during the clamping operation.

3. In a stopper for boiler tubes, a pair of collars, packing therebetween, means for clamping said collars together and upon the packing to force said packing into engagement with the walls of the tube, and a ring provided with a projecting part in connection with one of said collars for preventing the turning of the collars during the clamping operation.

4. In a stopper for boiler tubes, a packing to be forced into engagement with the walls of the tube to stop the same, a gland for engaging the packing, means for forcing the gland into engagement with the packing to expand the same, and a ring in connection with said gland for preventing the turning of the same during the expanding operation, said ring being provided with a plurality of spring fingers for engaging the inner walls of the tube.

5. In a stopper for boiler tubes, a pair of glands, packing therebetween, means for clamping said glands together and upon the packing to expand the packing to stop the tube, means comprising a projection in connection with one of said glands for preventing the turning of the glands during the clamping operation, and means comprising projections on the inner wall of each gland for preventing the turning of the glands with respect to each other, said projections engaging the packing between the glands.

6. A device for stopping boiler tubes comprising a body member adapted to extend axially within the tube, a head on each end of the body member, a pair of glands on each head, packing therebetween, means for turning the body member to draw the glands together and force the packing into engagement with the walls of a tube, one gland on each head having in connection therewith a projecting part for preventing its rotation during the clamping operation, and the walls of said glands which engage said packing being roughened.

7. In a stopper for boiler tubes, a pair of glands, packing therebetween, means for clamping them together and upon the packing to expand the packing to stop the tube, and projections from said glands engaging said packing for preventing the rotative movement of said glands with respect to each other.

8. In a stopper for boiler tubes, a packing to be forced into engagement with the walls of the tube to stop the same, a gland for engaging the packing, means for forcing the gland into engagement with the packing to expand the same, and a continuous ring in connection with said gland for preventing turning of the same during expanding operation, said ring having resilient portions at an angle to its main body for engaging the walls of the tube.

9. In a leak stopper for boiler tubes, a pair of glands, packing therebetween, means for clamping the said glands together and upon the packing to expand it to stop the tube, and means comprising a projection in connection with one of said glands for preventing the turning of the glands during the clamping operation, said projection being bent rearwardly and being of such length as to engage a tube adjacent the tube being stopped.

In testimony whereof I have hereunto set my hand in presence of two subscribing witnesses.

CORNELIUS S. CLARK.

Witnesses:
J. GRANVILLE MEYERS,
ARTHUR L. BRYANT.